US011800163B2

(12) United States Patent
Wei

(10) Patent No.: US 11,800,163 B2
(45) Date of Patent: Oct. 24, 2023

(54) CONTENT DELIVERY NETWORK ASSISTED USER GEOLOCATION

(71) Applicant: Sam Houston State University, Huntsville, TX (US)

(72) Inventor: Mingkui Wei, Huntsville, TX (US)

(73) Assignee: SAM HOUSTON STATE UNIVERSITY, Huntsville, TX (US)

( * ) Notice: Subject to any disclaimer, the term of this patent is extended or adjusted under 35 U.S.C. 154(b) by 0 days.

(21) Appl. No.: 17/549,786

(22) Filed: Dec. 13, 2021

(65) Prior Publication Data

US 2022/0191567 A1 Jun. 16, 2022

Related U.S. Application Data

(60) Provisional application No. 63/124,688, filed on Dec. 11, 2020.

(51) Int. Cl.
*H04N 21/258* (2011.01)
*H04N 21/858* (2011.01)
*H04N 21/643* (2011.01)
*H04N 21/214* (2011.01)

(52) U.S. Cl.
CPC ... *H04N 21/25841* (2013.01); *H04N 21/2143* (2013.01); *H04N 21/64322* (2013.01); *H04N 21/858* (2013.01)

(58) Field of Classification Search
CPC ......... H04N 21/25841; H04N 21/2143; H04N 21/64322; H04N 21/858; H04N 21/2225; H04L 67/568
See application file for complete search history.

(56) References Cited

U.S. PATENT DOCUMENTS

| | | | |
|---|---|---|---|
| 2007/0033588 A1* | 2/2007 | Landsman | H04L 51/08 707/E17.119 |
| 2014/0280746 A1* | 9/2014 | Johns | H04L 67/06 709/219 |
| 2014/0280963 A1* | 9/2014 | Burbridge | H04L 67/125 709/226 |
| 2015/0006615 A1* | 1/2015 | Wainner | H04L 67/1021 709/203 |
| 2016/0294642 A1* | 10/2016 | Hopkins | H04L 41/12 |

* cited by examiner

*Primary Examiner* — Adil Ocak

(74) *Attorney, Agent, or Firm* — Kowert, Hood, Munyon, Rankin & Goetzel PC

(57) ABSTRACT

Described herein is a novel approach for coarse-grained user geolocation leveraging widely-deployed content delivery networks (CDNs). This method relies on the fact that CDN providers deploy a number of edge servers that are geographically distributed across the world. Many of these edge servers are assigned with unique identifiers that are tied to their location, which can be retrieved by inspecting HTTP responses headers served by these edge servers. As a result, a website can infer coarse-grained user location by asking a user to send an HTTP request to an arbitrary domain that is known being served by a CDN, and inspecting the corresponding responses.

20 Claims, 6 Drawing Sheets

CONTENT DELIVERY NETWORK ASSISTED USER GEOLOCATION

PRIORITY CLAIM

This patent application claims priority to U.S. Provisional Patent Application No. 63/124,688, filed Dec. 11, 2020, which is incorporated by reference in its entirety.

BACKGROUND OF THE INVENTION

1. Field of the Invention

The invention generally relates to methods of determining the location of a device.

2. Description of the Relevant Art

Websites in today's Internet rely more and more on obtaining users' location to provide customized services, such as regional campaigns or promotional activities. Currently, the primary method to obtain a user's location is based on the user's IP address, to which there are two major approaches. The first approach is to directly obtain the user's IP address, and search it against existing databases. The second approach is to leverage web APIs provided by Internet giants such as Google, who maintains substantial user information collected via multiple means (Wi-Fi wardriving, for example).

Both approaches, however, have their disadvantages. For the IP-based user geolocation, the major issues lie in the lack of official ground truth to validate the correctness and accuracy of existing databases. It has been found by existing studies that for the same IP address, the distance between the locations obtained from two different databases can be as large as 800 km. The API-based approach, on the other hand, can obtain very accurate results. However, modern browsers have built-in mechanisms to block such APIs from operating. For instance, Google's geolocation API will trigger a pop-up window asking the user's permission to explicitly allow his/her location to be shared with the website the user is visiting. As Internet users' concern regarding their privacy is daily increasing, more likely than not, the user is going to block such location requests unless there are legitimate reasons to allow them.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
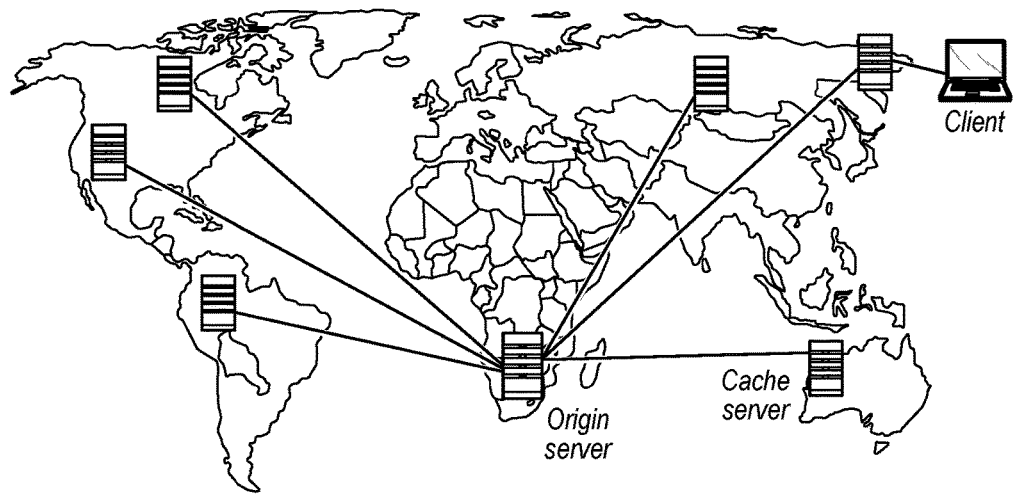
FIG. 1 is a schematic diagram of a Content Delivery Network (CDN).

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Described herein is a method for determining the location of a device by using content delivery networks (CDNs). This method of geolocation takes advantage of CDN provider's use of a large number of edge servers geographically distributed. Many of these edge servers are assigned with unique identifiers that are tied to their geolocation. The location of the edge server can be retrieved from HTTP responses served by these edge servers. By asking a client to issue a regular HTTP request to a domain that is served by CDNs and by inspecting the corresponding response headers, a website can infer the location of the user who is currently visiting it. Such cache-based geolocation, although coarse-grained, can be sufficient for purposes such as regional campaign or advertisement. Furthermore, this method can be used as a side-channel knowledge to cross-validate the results obtained from conventional IP-based geolocations.

Compared to conventional IP-based user geolocation, the cache-based CDN approach has the following advantages:
1. The mechanism of the cache-based CDN geolocation is very straightforward. While IP-based geolocation requires a website to interact with databases leveraging web APIs, the CDN approach can be implemented with just a few lines of JavaScript embedded in the web document, which asks the client to issue one regular HTTP request and retrieve one value from response headers.
2. IP-based geolocation relies on third party databases that may incur subscription fees, while the CDN approach is self-contained and completely free since all that required is to ask the user to issue an HTTP request to a public domain.
3. The correctness and accuracy of IP-based geolocation are hard to be validated because there lacks any official ground truth. Cache-based approach, on the other hand, is based on publicly known and reliable information and therefore bears higher reliability.

Most webservers use IP addresses to determine a user's location due to its simplicity. For IP-based user geolocation, the webserver subscribes to geolocation IP databases, which map ranges of IP addresses to the corresponding latitude and longitude coordinates. The pair of coordinates provides the sever with the location of the IP address, including, but not limited to, country and city.

There are many available IP geolocation databases, including ip2c.org, GeoLite2Geo Targetly, IP2Location Lite, and GeoIP Nekudo. While using such databases allows a server to locate a user without the need for GPS receivers or complicated configuration switching, this method of geolocating suffers from plentiful of drawbacks. For instance, IP-based geolocation is far from reliable and accurate since it only provides a rough estimate of users' locations. For example, it has been shown that the locations obtained from different databases suffer huge accuracy errors, up to 800 km in some cases. For instance, it was found that one IP address was located in Hong Kong by one database, but the same IP address was located in Australia by another database. Further, IP databases come with many operation overheads such as paid subscriptions for support, frequent updates to improve data accuracy, scalability, and management issues.

An alternate method of geolocation uses city-level IP geolocation based on a network topology community detection method to improve the accuracy of geolocation. The community detection algorithm in complex networks is used to find the different communities in the network topology and determine the location of the communities. The geographical position of a target IP is obtained according to the communities of the target IP.

IP address allocation in cellular data networks has also been studied, with emphasis on understanding the feasibility of IP-based geolocation techniques. These techniques use commercial IP geolocation databases to test the ability of the databases to return host location based on IP addresses seen by the application's server.

API-based geolocation is a new approach that uses the browser's HTML5 Geo-location feature along with the Maps JavaScript API to detect users' locations, all leveraged by Google's comprehensive database about the user's profile. While this approach brings higher location accuracy, the location is only shared if the user allows location sharing in a pop-up window. With more and more Internet users beginning to be concerned about their privacy, a user will likely deny such request unless necessary.

Content delivery network, or CDN, is a type of web cache that has undergone substantial growth in the recent decade. It provides a scalable and cost-effective mechanism for accelerating web document dissemination throughout the Internet by deploying a large number of edge servers around the globe. These edge servers sit between HTTP clients and origin servers, which cache static web documents served by origin servers, and use the cached copies to serve subsequent duplicate requests. Consequently, requests sent by a user in a certain location will most likely be served by the nearest CDN edge server, regardless of the origin server location. For example, as shown in FIG. 1, users located in the U.S. will be served by the servers in North America instead of the origin server in Africa. As a result, users will not only experience shorter page loading times, but the origin server will also see reduced workload in terms of the volume of HTTP requests. Because of these advantages, CDN has been adopted by a plethora of websites in recent years.

The idea of CDN geolocation is motivated by the fact that HTTP responses served by CDN edge servers are usually appended with CDN specific information. For some CDNs, such information reveals the location of the edge servers by whom the request was served. For example, Table 1 presents typical response headers served by an edge server (e.g., AMAZON CLOUDFRONT), where the request was sent via an HTTP proxy that is located in Texas, U.S.A. As highlighted in line 6 of the header, the X-Amz-Cf-Pop response header is a customized header appended by all edge servers that belong to AMAZON CLOUDFRONT, and whose value indicates the request is served by the edge server DFW55-C1. This header value implies that the request is served by the edge server near Dallas, TX, because it is a common practice among many CDNs to name their edge servers with the three-letter IATA airport codes that are close to the server. In this case, DFW refers to the Dallas/Fort Worth International Airport. Furthermore, because CDNs always serve HTTP requests with the edge servers closest to the user, it can be inferred that the user who issued the request must be somewhere close to the city of Dallas. In the following, such information can be leveraged to identify users' locations.

TABLE 1

| | |
|---|---|
| 1 | HTTP/1.1 200 OK |
| 2 | Content-Type: text/html; charset=UTF-8 |
| 3 | ... |
| 4 | X-Cache: Miss from cloudfront |
| 5 | Via: 1.1 5d52966f37c4378fd883294634452d6b.cloudfront.net (CloudFront) |
| 6 | X-Amz-CF-Pop: DFW55-C1 |

Figure 2:
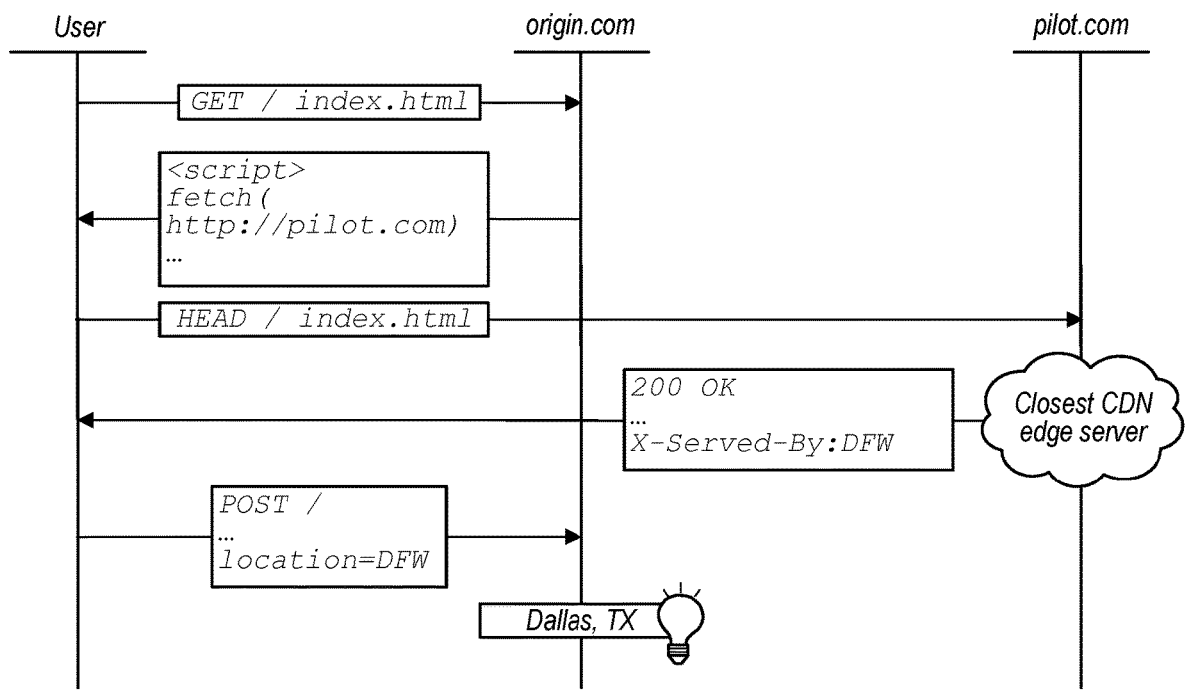
FIG. 2 is a flowchart depicting a method of determining the geolocation of a device.

FIG. 2 depicts a flowchart depicting a schematic diagram of how a website can infer a user's geolocation leveraging CDN response headers. To facilitate the following illustration, as used herein, the term "publisher" to refer the owner of the website that is visited by a user. The publisher wants to infer the user's location. It can be assumed that the publisher owns the domain "origin.com". It can also be assumed that another domain, "pilot.com", is a domain that is served by a CDN whose edge servers append location related headers to the responses.

As shown in FIG. 2, a user visits the publisher's default main page "origin.com" by sending a HTTP GET request (GET/index.html), and the webserver will respond with the requested document once the request is received. In order to infer the user's location, the webserver inserts JavaScript code (or other web server code) as a part of index.html, which requests the user to issue an HTTP request to the pilot domain "pilot.com". Because the method only requires the response header, a HEAD request (HEAD/index.html) is sufficient.

After the document "origin.com/index.html" is received by the user's browser, the browser will execute the JavaScript code and issue the request, which will be served by the closest edge server. The edge server will send a response back to the user's browser that includes the edge server's customized header indicating its identity. Once the response from the edge server is received at the user's browser, the JavaScript will inspect the response headers, retrieve the edge server identifier, and send it back to "origin.com", which can be attached as the content of a POST request, or simply appended as a query string using a GET request. The publisher, knowing that DFW implies Dallas, can then infer the user is located in Texas and close to the city Dallas.

As depicted in FIG. 2, "origin.com" takes two steps to infer the user's geolocation: 1) it requests the user to issue an HTTP request to a pilot domain; and 2) it inspects the response to retrieve the value of a specific response header. While issuing the request and inspect response header can be easily done with just a few lines of JavaScript as presented in Table 2.

A barrier that may prevent the header information from being accessed lies in the "same-origin policy" (SOP) incorporated in most modern web browsers. The SOP is a critical security mechanism, which restricts an interaction between a resource request issued from one origin when the actual resources reside on another origin. The origin is composed of the three parts: scheme, the host, and the port number.

TABLE 2

| | |
|---|---|
| | var xhr = new XMLHttpRequest ( ); |
| 1 | var url = 'https://pilot.com/'; |
| 2 | xhr.open ('HEAD', url); |
| 3 | xhr.send ( ) |
| 4 | xhr.onreadystatechange = function ( ) { |
| 5 | if(xhr.readyState == 4) { |
| 6 | var p = xhr.getResponseHeader ('X-Served-By'); |
| 7 | } |

Two origins are not considered identical unless all three parts match. With strict SOP being enforced, the web browser does not allow JavaScripts in one origin to access resources, including sending requests to or reading responses from, another origin. However, because cross-origin resource referencing is prevalent in today's Internet, SOP is loosened by the cross origin resource sharing (CORS) policy, which allows scripts from one origin to access resources from another origin under certain circumstances.

Particularly, for one origin to access resources from another origin, the latter origin must allow the resource sharing by explicitly appending a set of CORS response headers. For example, assume the JavaScript in Table 2 is included in origin.com/index.html and is parsed by a user's web browser. Prior to sending the actual HEAD request, the browser will first send an OPTIONS request to pilot.com (known as the pre-flight request) as shown in Table 3, and check the response headers. The subsequent HEAD request will be sent only if the header Access-Control-Allow-Origin exists in the response and either origin.com or the wildcard symbol * presents as the value. Otherwise, the browser will not send the HEAD request at all because pilot.com does not allow origin.com to access its resources.

TABLE 3

| | |
|---|---|
| 1 | OPTIONS /index.html |
| 2 | Access-Control-Request-Method: GET |
| 3 | Origin: https://example.com |
| 4 | ... |

Furthermore, even if Access-Control-Allow-Origin exists and origin.com is explicitly allowed, the browser still restricts origin.com that only the 7 CORS-safelisted response headers can be accessed: Cache-Control, Content-Language, Content-Length, Content-Type, Expires, Last-Modified, and Pragma. In order to access the CDN specific header, for example, the X-Served-By header, another CORS header, i.e., Access-Control-Expose-Headers, must also exist and explicitly specify either X-Served-By or * as the value.

Therefore, in order to successfully obtain the CDN related response header by issuing HTTP request and reading the response, origin.com must find a pilot domain that explicitly appends the headers Access-Control-Allow-Origin and Access-Control-Expose-Headers, and specify origin.com or *, and X-Served-By or * as the values, correspondingly.

In various embodiments, a way to obtain such a pilot domain is for the publisher to set up a dedicated domain and subscribe to CDN services, where the pilot domain can simply be a subdomain of origin.com. For instance, the publisher can create the subdomain cloudfront.origin.com and subscribe it to Cloudfront's service. Because this domain is entirely controlled by the publisher, the two CORS headers can be directly inserted into response headers by configuring the webserver. Because origin.com is only interested in the response headers, the pilot domain does not need to be substantiated with any real content. For example, a completely blank HTML page will be sufficient for obtaining the header information from the pilot. Because many CDNs offer free tier services based on limited traffic amount or cost (for example, CLOUDFLARE offers free tier service, FASTLY provide $50 worth of credit for new customers, and CLOUDFRONT set the first 50 GB traffic free of charge), a HEAD request only incurs minimal traffic and negligible cost at best.

Another approach to find a suitable pilot domain is to scan the Internet and attempt to find an independent domain that subscribed to a specific CDN service, and also includes the two headers Access-Control-Allow-Origin and Access-Control-Expose-Headers and the desired value (which should be *, because the specific value origin.com and X-Served-By is unlikely to be set by an independent third-party domain). This task could be laborious but not impossible. For instance, by scanning the first 50K domains against the Majestic Million domain list, it was found the domain cwtv.com is subscribed to Cloudflare's CDN service, and has the above two headers being present and value set to be *. Compared with the first approach, this approach only requires a one-time task and is simpler since it eliminates the complexities to set up the subdomain and subscribe to CDN services.

Compared with conventional IP-based user geolocation, the CDN geolocation method offers advantages over previous methods of geolocation. The CDN geolocation method incurs very low overhead. The publisher only needs to insert a few lines of JavaScript code, while the user's browser only needs to issue two HTTP requests, one to the pilot domain to obtain CDN related information and one to the publisher to provide the location information. The CDN geolocation method is self-contained and does not rely on a third-party that provides dedicated user geolocation service. Additionally, the location information is obtained from CDN edge servers. The actual location of CDN edge servers is publicly available and thus verifiable.

On the other hand, in some embodiments, the granularity of CDN geolocation may be limited by the edge server's density and distribution, potentially reducing accuracy. Nevertheless, in many scenarios, such coarse-grained granularity may be sufficient. For example, a political campaign or commercial advertisement may target a broad region where fine-grained user location is favorable but unnecessary. Further, CDN geolocation can also serve as cross-validations to conventional IP-based geolocation to improve the results' reliability. For example, if an IP address is listed as being located in two different countries, CDN geolocation may be used to narrow down the results to the correct country.

CDN is a relatively new business model that has emerged in the recent decade, and their distribution of services shows strong regional characters. Major CDN providers in North America include both traditional Internet companies, including Google, Amazon, and Akamai, and relatively new ones founded in the last decade, such as Cloudflare and Fastly. According to an online survey, currently, there are 23 CDN providers in the United States, however, not all of them are suitable for geolocation purposes. In order to be used for user geolocation, a CDN must present the following two properties: its edge servers' locations are publicly known, and their locations are identifiable from HTTP response headers.

For the first factor, i.e., publishing edge servers' information, different CDNs show different tendencies. Some providers are very transparent and actively publish detailed information regarding their CDN network. For example, Cloudflare publishes its up-to-date data centers' location (also known as the point of presence, or PoP) and the number of servers at each location. On the other hand, providers such as Akamai are relatively conservative and only provide very brief information about their data centers' locations.

For the second factor, different CDN providers also take different approaches. Some providers, including Cloudflare, Cloudfront, and Fastly, append a customized response header to identify the edge server that served the request. In particular, Cloudflare appends the CF-RAY header, for example, CF-RAY:572244ec8cadd266-DFW, whose last section identifies the edge server. Cloudfront appends X-Amz-Cf-Pop header, for example, X-Amz-Cf-Pop: DFW55-C2, to indicate not only the location (i.e., DFW), but also specific edge server at this location (i.e., C2). Fastly inserts X-Served-By header, for example, X-Served-By: cache-dfw18677-DFW, whose last section identifies the edge server. On the other hand, CDN providers such as Googles' Cloud CDN only inserts a simple Via:1.1 google header to indicate the request is served by Google, Akamai does not have any header that reveals its edge server's identification either.

Validation of CDN Geolocation Method

For an example, based on the above discussion, three CDNs have been chosen to validate the described cache-based user geolocation, which are Cloudflare, Cloudfront, and Fastly. In order to obtain a preliminary knowledge of the accuracy that CDN geolocation can achieve, information was collected and analyzed regarding each CDN, as described in Table 4.

TABLE 4

|  | Cloudflare | Cloudfront | Fastly |
| --- | --- | --- | --- |
| Number of PoPs | N/A | 216 | 75 |
| Number of countries | 90 | 42 | N/A |
| Number of cities | 200 | 84 | 60 |

Information was collected regarding the data centers' location from each CDN's official website, and present the results in Table 4. Comparing the three, Cloudflare has the largest CDN network, which spans over 200 cities in more than 90 countries. A CDN provider may place multiple PoPs (Points of Presence, or data centers) in one city, but may not necessarily differentiate them. For instance, according to the website description, Cloudfront has 6 PoPs in Dallas, TX. During experiments, it was found that these data centers are assigned with different names including DFW3, DFW50, DFW52, DFW53, DFW55 (in this instance, only 5 PoP names were visible). On the other hand, Fastly states that it has 2 PoPs present at Dallas, but in this instance, only the unified identifier DFW was visible and thus may not be used to distinguish the two servers.

Based on our preliminary evaluation, it was suspected that the information published on CDN providers' website may not have been up-to-date. Therefore, as the second step, a live scan was conducted to verify existing CDNs and identify new information. It is known that all three providers publish the range of IP addresses they own on their website. The whole IP range was scanned for TCP port 80. Cloudflare, Cloudfront and Fastly have 1,786,881; 1,422,793; and 222,208 unique IP addresses, respectively, among which 96,671; 140,347; and 65,969 are alive (i.e., responded to the scan). Note that these results are likely transient because CDN providers usually dynamically assign IP addresses to edge servers due to reasons such as load balancing, however, the results provide a snapshot of these CDN networks, based on which an analysis can be conducted.

A simple python script was created for leveraging the requests library to send a HEAD request to each live IP address. For simplicity purposes, for each request, the Host header was set to be a random string (e.g., Host:aaa) rather than any valid host names. Because the host header is not recognizable by the edge servers, they will respond with an error page indicating the specified host name is not accessible (500 Domain Not Found from Fastly; 409 Conflict from Cloudflare, and 403 Forbidden from Cloudfront), which nonetheless satisfied the purpose because even the error page still contains a response header that includes the edge servers' identifier. After all responses were received, the response headers and edge servers' identifiers were inspected and the results are summarized in Table 5. A total of 283 unique edge server IDs were identified for Cloudfront, which is much larger than the number of PoPs stated on its website (i.e., 216), implying the information on its website is obsolete. Fastly presents a slight difference, i.e., 78 obtained by scanning vs. 75 stated on the website. Cloudflare's CDN network was not scanned because Cloudflare's CDN network uses Anycast. As a result, even though a request was sent to a specific IP address, the request is always routed to and served by the closest edge server. Therefore, only the single edge server identifier that is closest can be seen.

TABLE 5

|  | Cloudflare | Cloudfront | Fastly |
| --- | --- | --- | --- |
| Total IP addresses | 1,786,881 | 1,422,793 | 222,208 |
| Live IP addresses | 96,671 | 140,347 | 65,969 |
| Unique IDs | N/A | 983 | 78 |

From the edge server maps of the three CDNs, it is evident that their edge servers are densely deployed only in North America and Europe. Therefore, higher accuracy and finer granularity may be expected in these regions. However, in various embodiments, it may not be needed to practically geolocate users worldwide. Further, such a shortage can be easily addressed by leveraging more regional CDNs. For example, Alibaba CDN, a China-based cloud service provider, has 39 data centers deployed in major cities in China, which can be used to geolocate China-based users with much higher accuracy.

In order to evaluate the usability and accuracy of the cache-based geolocation, VPN services were used. Access to Express VPN, a VPN provider that has 160 VPN endpoints across 94 countries, was obtained. Express VPN also has a Linux command-line interface that allows scripts to be written for conducting experiments in batch.

The experiment was initiated by performing a first scan against the Majestic Million domain list as mentioned above, and three arbitrary domains that use Cloudfront, Cloudflare, and Fastly's service, respectively, were found. Then, a script that can automatically log in to each VNP endpoint and issue three HTTP requests to each of these three domains was written. Then, the response from these three domains was collected and the edge server identifier extracted and saved into a log file.

It should be noted that because the exact location of any of these VPN endpoints may be unknown except for only the country (or city, for a few cases) each endpoint is placed, in this example, their accurate locations were not pinpointed or verified using cache-based geolocation. Instead, an evaluation was made as to what extent these 160 locations can be uniquely differentiated using the disclosed CDN geolocation method. Accordingly, the effectiveness of CDN geolocation as a general solution for device geolocation is evaluated. For instance, as these endpoints can be uniquely differentiated, knowing the identity and accurate location is only a trivial and laborious task. For example, a capable publisher could gradually build its own database based on users' information. The publisher can enable the cache-based location and still ask to access the user's GPS based location. Although such requests may be rejected by most users, it is still likely to be allowed by a few users due to reasons such as carelessness or by accident. Once the publisher obtains one accurate location, it can associate this accurate location with the specific CDN edge server identifier, and be informed that users with the same CDN identifier are from a place that is close to this known accurate location. Gradually, the publisher would be able to build an accurate geolocation map, which can be further refined each time a user allows his/her accurate location to be accessed.

Figure 3:
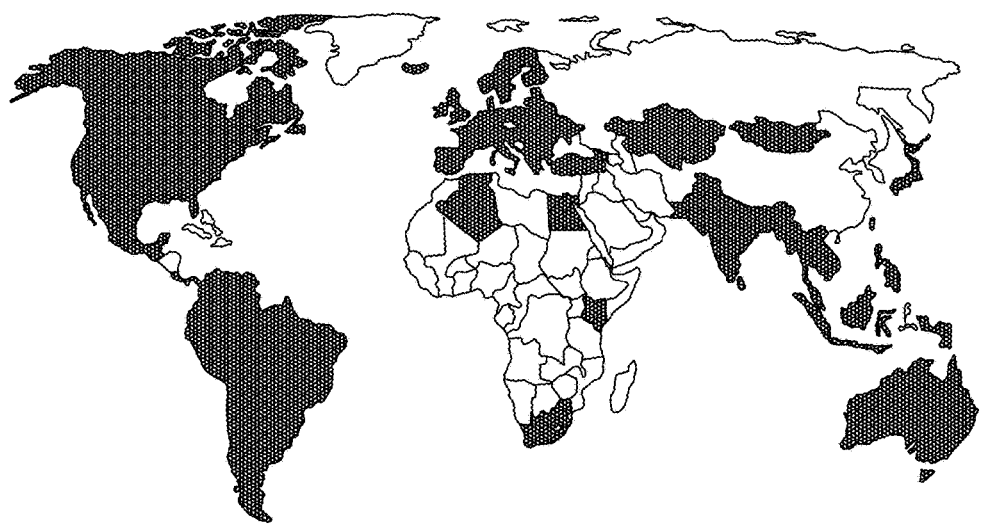
FIG. 3 depicts a map of countries where Express VPN endpoints are located.

During the experiment, 148 endpoints among 160 that is claimed on Express VPN's official website were successfully connected and a total of 444 HTTP responses were collected. These 148 endpoints spanned 93 countries, which covers most countries in America and Europe, many countries in Southeast Asia, and a few countries in the Middle East and Africa, which is consistent with the official website description. Most endpoints were named by the country name where they are located. FIG. 3 shows a map of the countries that were covered by Express VPN's endpoints. Among these 93 countries, 13 countries have more than one VPN endpoint present, in which case, these endpoints were named by the country name appended with the city's name and a numerical index.

The three CDNs that were chosen, i.e., Cloudfront, Cloudflare, and Fastly, are US based CDN providers and have their market focus in North America and Europe. Therefore, it was to be expected that the accuracy of CDN geolocation would be more accurate in differentiating European countries. In the following description, the results for European countries and the rest of the world is demonstrated.

Figure 4:
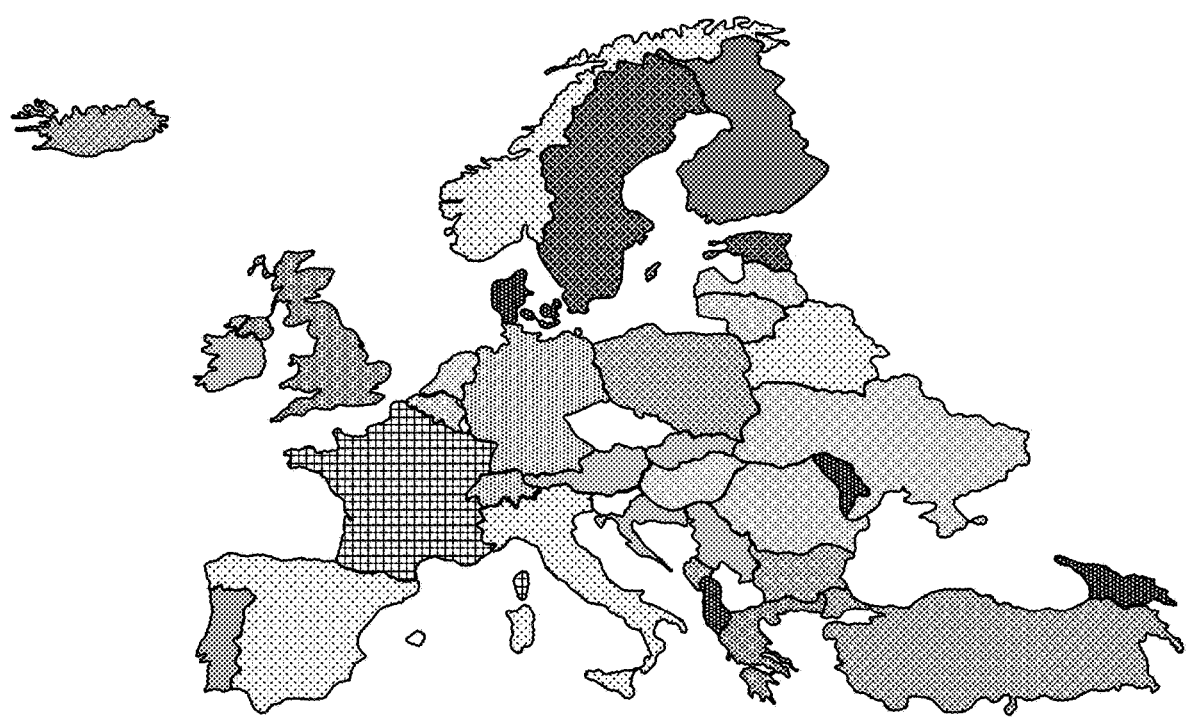
FIG. 4 depicts a map of European countries served by different Cloudfront edge servers.
Figure 7:
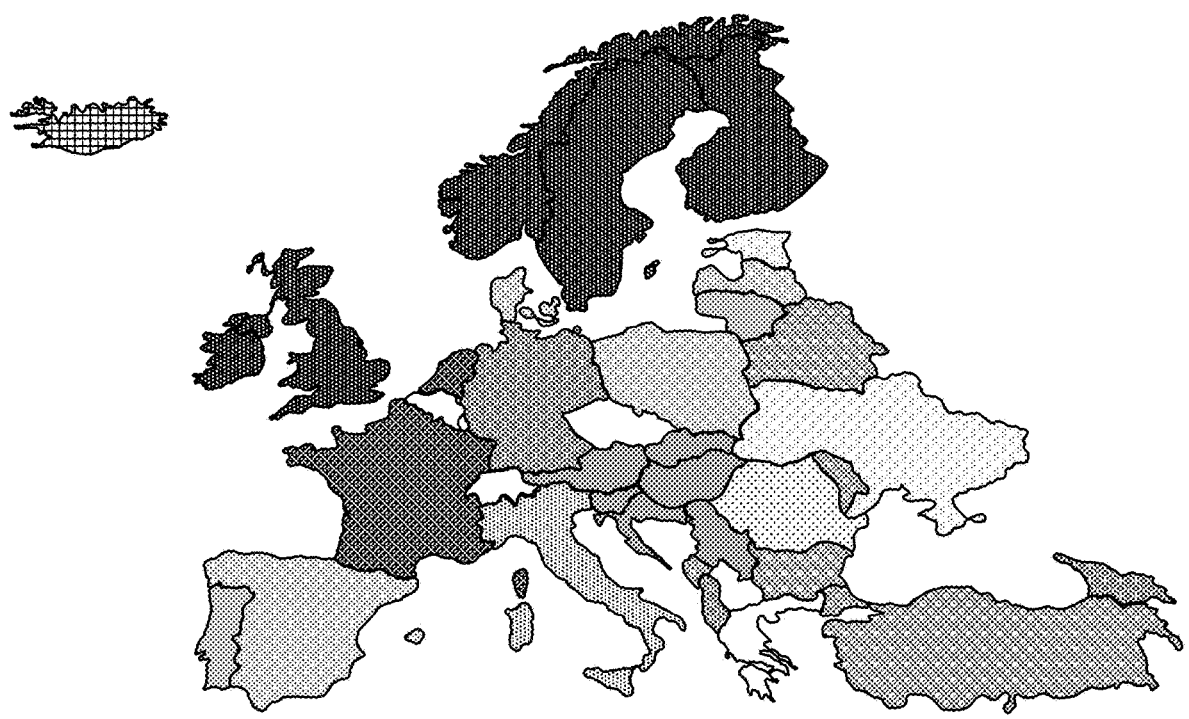
FIG. 7 depicts a map of European countries served by different Cloudflare edge servers.
Figure 8:
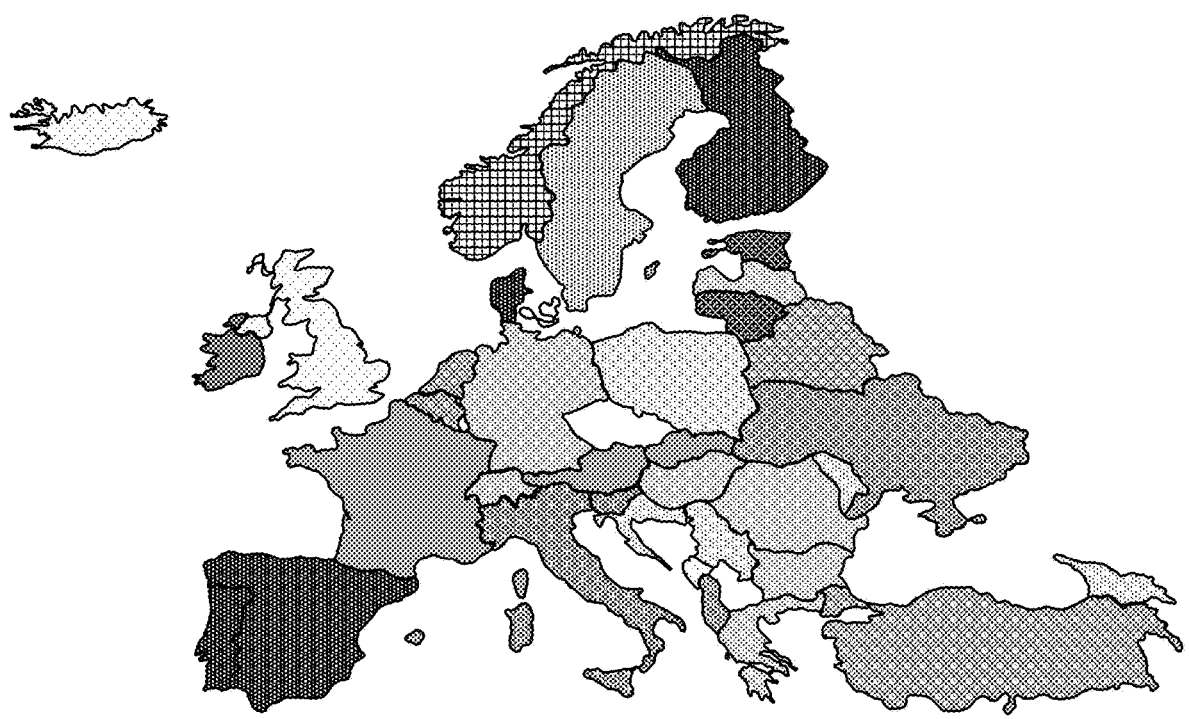
FIG. 8 depicts a map of European countries served by different Fastly edge servers.

The geolocation result with a single CDN is presented first. In total, these 93 countries were served by 41 Cloudfront edge servers, 24 Fastly edge servers, and 31 Cloudflare edge servers, respectively. Among which, 46 European countries were served by 23, 12, and 18 edge servers from Cloudfront, Fastly, and Cloudflare, and 47 non-European countries were served by 20, 14, and 15 edge serves from the same three CDN providers. This implies that, for example, using Cloudfront's edger server, a user's location could be narrowed down to two countries on average, if the user is within Europe (i.e., 46/23=2). The visualized map of Cloudfront's result is presented in FIG. 4, where different patterns are used to identify countries being served by different edge servers. The same result from Cloudflare and Fastly are presented in FIG. 7 and FIG. 8.

From these figures, it can be seen that edge server deployment does present strong regional characters. Take FIG. 7 as an example, where it can be observed that the few adjacent countries in middle Europe including Austria, Slovenia, Croatia, Serbia, and Slovakia are all served by one edge server. Furthermore, by comparing the maps between different CDNs, it is noticed that different CDN's have different edge server deployment strategies. For instance, in Fastly's edge server map, it can be seen that while Austria and Slovakia are still served by the same edge server, Slovenia was instead served by the edge server that also serves Italy. Croatia and Serbia were served by another different edge server. This implies that a finer granularity of user geolocation can be achieved by leveraging multiple CDNs, similar to user location using cellular towers with trilateration.

Figure 5:
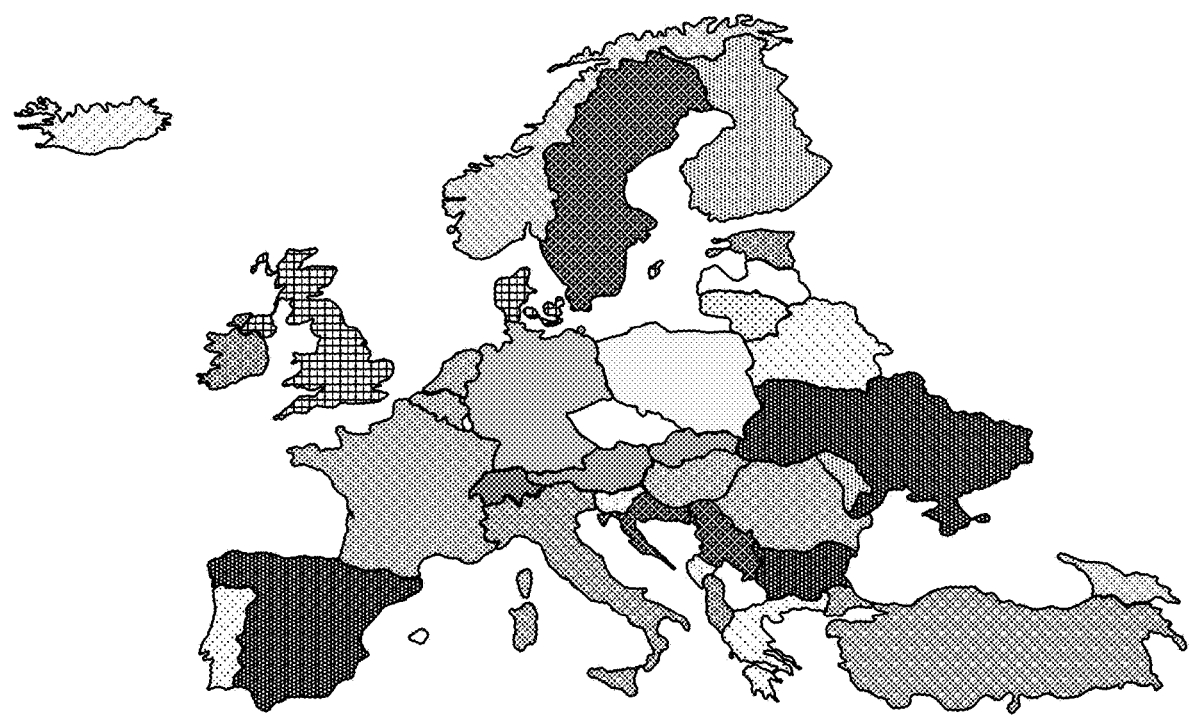
FIG. 5 depicts a map of countries served by leveraging 3 CDNs' edge servers.

By holistically considering these 3 CDNs, the 93 countries now see 57 different Cloudfront-Cloudflare-Fastly edge server combinations, a higher resolution than any of the three single CDNs. For the 46 European countries, they can now be separated into 35 categories, a 25% increase in accuracy, i.e., a European user can now be narrowed down into an average 1.3 countries. For the 47 non-European countries, they can be separated into 23 categories. The new geolocation map leveraging all 3 CDNs is presented in FIG. 5. Comparing with FIGS. 4, 7, and 8, it is obvious that higher accuracy has been achieved, as less adjacent countries share the same pattern.

Figure 6:
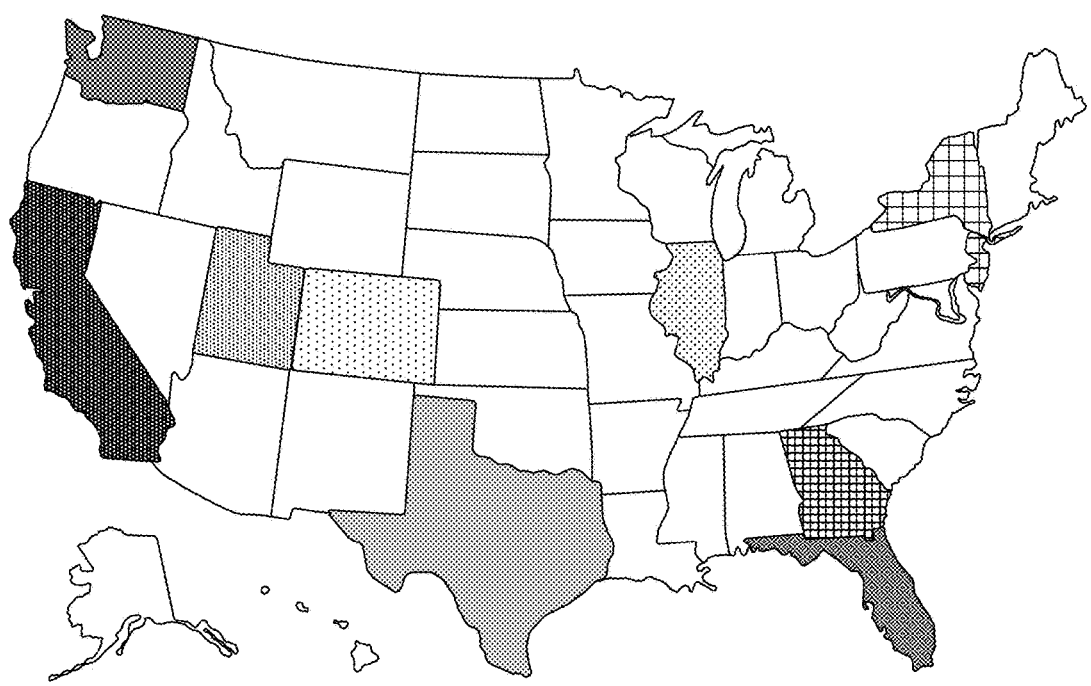
FIG. 6 depicts US states identified by leveraging 3 CDNs.

Next, the CDN geolocation method can be applied to identify states and cities in the US. Express VPN has 27 endpoints located within the United States, which were distributed among 13 cities that belong to 10 states (excluding Washington, D.C.). Metropolitan cities such as Los Angeles have more than one endpoint. Shown in FIG. 6 is the result when all 3 CDNs are leveraged to geolocate the states where these endpoints are located. Because these states are geographically sparse, any one of the 3 CDNs alone may be capable of uniquely identifying these states. Among these ten states, Florida has two endpoints located in Tampa and Miami. California has two endpoints located in Los Angeles and San Francisco. All these cities can also be uniquely identified by either one of these 3 CDNs.

Finally, the accuracy of CDN geolocation can be evaluated within the sub-city level. In particular, within the U.S., five metropolitan cities have more than one endpoint. Los Angeles has seven endpoints. Dallas, Miami, New York, and Washington, D.C., each has two endpoints. According to experimental results, Cloudflare has the lowest resolution in identifying sub-city level locations, for example, all seven endpoints in Los Angeles were served by the edge server LAX. Cloudfront has the highest resolution, which alone can identify five endpoints located in Low Angeles. When put together, the seven endpoints can be differentiated into six categories, implying satisfactory resolution in high population cities. Detailed results are demonstrated in Table 3. For the other four cities, except the two endpoints in New York, all other endpoints can be uniquely identified when three CDNs are utilized.

TABLE 6

| Endpoint's Name | Cloudflare | Fastly | Cloudfront |
|---|---|---|---|
| Los Angeles | LAX3-C1 | BUR | LAX |
| Los Angeles-1 | LAX3-C3 | LAX | LAX |
| Los Angeles-2 | LAX3-C4 | BUR | LAX |
| Los Angeles-3 | LAX3-C1 | BUR | LAX |
| Los Angeles-4 | LAX50-C1 | BUR | LAX |
| Los Angeles-5 | LAX3-C3 | BUR | LAX |
| Santa Monica | LAX3-C2 | LAX | LAX |

Example Methods

Figure 9:
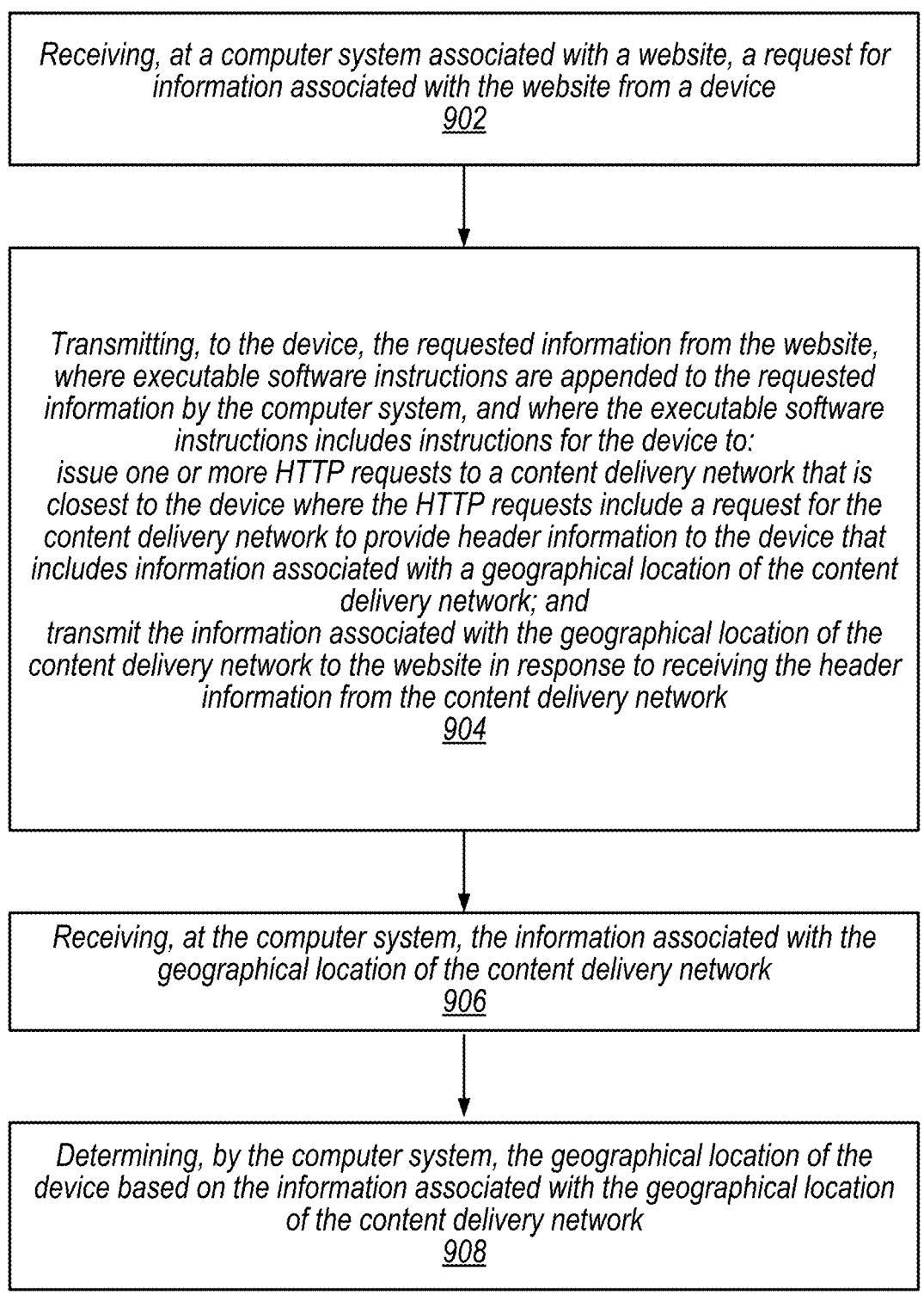
FIG. 9 is a flow diagram illustrating a method of determining a geographical location of a device requesting information from a website, according to some embodiments.

FIG. 9 is a flow diagram illustrating a method of determining a geographical location of a device requesting information from a website, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 902, in the illustrated embodiment, a computer system associated with a website receives a request for information associated with the website from a device. In some embodiments, the request for information associated with the website is received from a web browser on the device where the instructions for issuing the HTTP requests and transmitting the information associated with the geographical location of the content delivery network are instructions to be performed by the web browser.

At 904, in the illustrated embodiment, the computer system transmits, to the device, the requested information from the website where executable software instructions are appended to the requested information by the computer system and where the executable software instructions includes instructions for the device to: issue one or more HTTP requests to a content delivery network that is closest to the device where the HTTP requests include a request for the content delivery network to provide header information to the device that includes information associated with a geographical location of the content delivery network; and transmit the information associated with the geographical location of the content delivery network to the website in response to receiving the header information from the content delivery network. In some embodiments, the information associated with the geographical location of the content delivery network is the location of the content delivery network. In some embodiments, the information associated with the geographical location of the content delivery network includes information that allows the location of the content delivery network to be determined by the computer system.

In some embodiments, the executable software instructions are in JavaScript code. In some embodiments, the executable software instructions are instructions to be automatically executed when the device receives the requested information. In some embodiments, the content delivery network hosts a subdomain of the website. In some embodiments, the content delivery network hosts a separate domain not associated with the website that cooperates and facilitates geolocation of the device for the website. In some embodiments, the header information includes an identifier for an airport closest to the content delivery network. In some embodiments, the request for the content delivery network to provide header information is a request only for header information from the content delivery network.

At 906, in the illustrated embodiment, the computer system receives the information associated with the geographical location of the content delivery network.

At 908, in the illustrated embodiment, the computer system determines the geographical location of the device based on the information associated with the geographical location of the content delivery network. In some embodiments, determination of the geographical location of the device is assisted by IP-based geolocation of the device.

Figure 10:
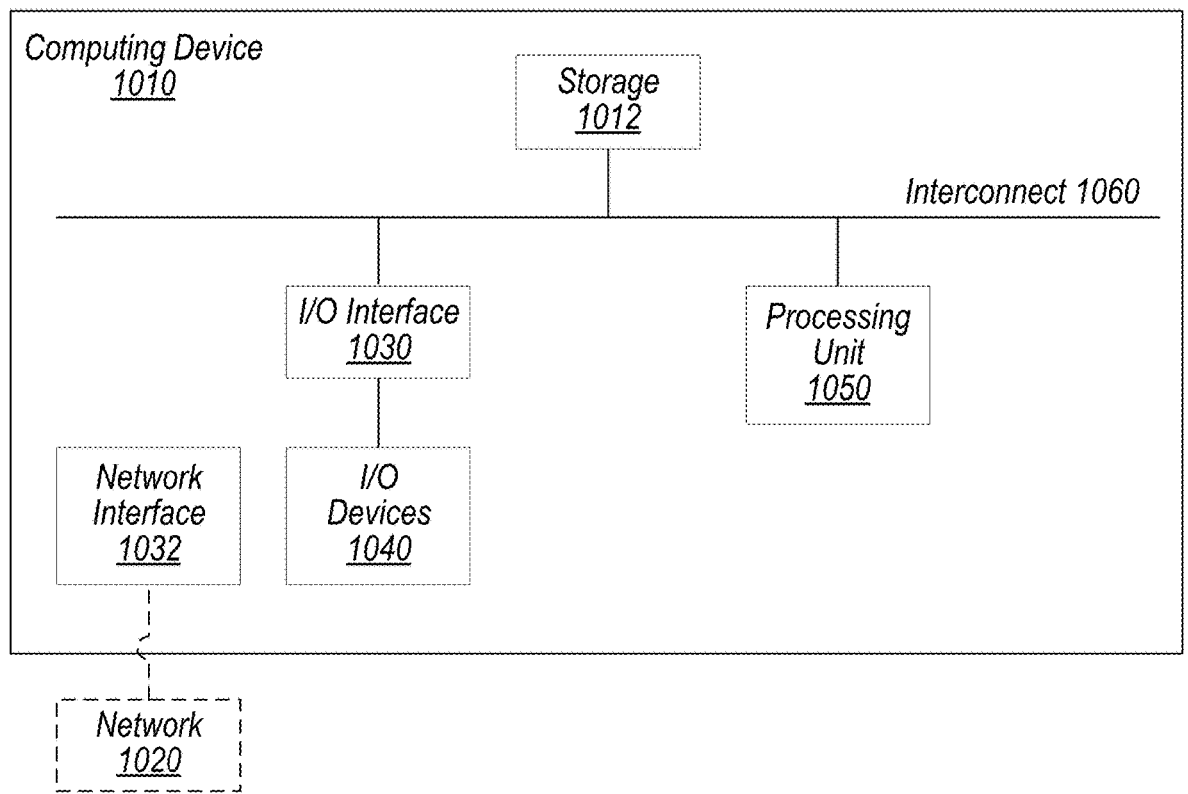
FIG. 10 is a block diagram of one embodiment of a computer system.

In some embodiments, the computer system accesses an IP-based geographical location of the device from a geolocation database and determines whether a difference exists between the determined geographical location of the device and the IP-based geographical location. In some embodiments, in response to determining that the difference exists between the determined geographical location of the device and the IP-based geographical location, the computer system provides an indication of the difference along with the determined geographical location of the device to the geolocation database. In some embodiments, the IP-based geographical location is updated in response to determining that the difference exists between the determined geographical location of the device and the IP-based geographical location Example Computer System Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 1012 is usable by processing unit 1050 (e.g., to store instructions executable by and data used by processing unit 1050). Storage 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 1012 may consist solely of volatile memory, in one embodiment. Storage 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The examples disclosed herein are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of determining a geographical location of a client device requesting information from a website, the method comprising:
receiving, at a computer system associated with a website, a request for information associated with the website from client device;
transmitting, by the computer system and to the client device, the requested information from the website, wherein executable software instructions are appended to the requested information by the computer system, and wherein the executable software instructions includes instructions for the client device to:
issue, by the client device, one or more HTTP requests to a content delivery network, wherein the HTTP requests include a request for the content delivery network to provide header information to the client device that includes identity information for an edge server of the content delivery network closet to the client device, the identity information including a geographical location of the edge server of the content delivery network closest to the client device;
receive at the client device, the requested header information from the edge server of the content delivery network closest to the client device, wherein the received header information includes the identity information for the edge server; and
transmit, by the client device, the identity information for the edge server to the computer system in response to receiving the header information from the edge server; and
identifying, by the computer system, the geographical location for the edge server that transmitted the header information to the client device by assessing the identity information received from the client device; and
determining, by the computer system, the geographical location of the client device based on the geographical location identified for the edge server that transmitted the header information to the client device.

2. He method of claim 1, wherein the identity information for the edge server includes an identity of the edge server.

3. The method of claim 1, wherein the identity information for the edge server includes information that allows the geographical location of the edge server to be identified by the computer system.

4. The method of claim 1, wherein the request for information associated with the website is received from a web browser on the device, and wherein the instructions for issuing the HTTP requests and transmitting the information associated with the geographical location of the content delivery network are instructions to be performed by the web browser.

5. The method of claim 1, wherein the executable software instructions are in JavaScript code.

6. The method of claim 1, wherein the executable software instructions are instructions to be automatically executed when the device receives the requested information.

7. The method of claim 1, wherein the content delivery network hosts a subdomain of the website.

8. The method of claim 1, wherein the content delivery network is a separate domain not associated with the computer system.

9. The method of claim 1, further comprising determining the geographical location of the client device assisted by IP-based geolocation of the client device.

10. A method of determining a geographical location of a client device requesting information from a website, the method comprising:
receiving, at a computer system associated with a website, a request for information associated with the website from a client device;
transmitting, by the computer system and to the client device, the requested information from the website, wherein executable software instructions are appended to the requested information by the computer system, and wherein the executable software instructions includes instructions for the client device to:
issue, by the client device, one or more HTTP requests to a content delivery network, wherein the HTTP requests include a request for the content delivery network to provide header information to the client device that includes identity information for an edge server of the content delivery network closest to the client device, the identity information including a geographical location of the edge server of content delivery network closest to the client device;
receive, at the client device, the requested header information from the edge server of the content delivery network closest to the client device, wherein the received header information included the identity information for the edge server; and
transmit, by the client device the identity information for the edge server to the computer system in response to receiving the header information from the edge server;
identifying, by the computer system, the geographical location for the edge server that transmitted the header information to the client device by assessing the identity information received from the client device;
determining, by the computer system, the geographical location of the client device based on the geographic location identified for the edge server that transmitted the header information to the client device;
accessing, by the computer system, an IP-based geographical location of the client device from a geolocation database; and
determining, by the computer system, whether a difference exists between the determined geographical location of the client device and the IP-based geographical location.

11. The method of claim 10, further comprising, in response to determining that the difference exists between the determined geographical location of the client device and the IP-based geographical location, providing an indication ofthe difference along with the determined geographical location of the client device to the geolocation database.

12. The method of claim 10, further comprising updating the IP-based geographical location in response to determining that the difference exists between the determined geographical location of the client device and the IP-based geographical location.

13. The method of claim 10, wherein the identity information for the edge server includes an identity of the edge server.

14. The method of claim 10, wherein the identity information for the edge server includes information that allows the geographical location of edge server to be identified by the computer system.

15. The method of claim 10, wherein the request for information associated with the website is received from a web browser on the device, and wherein the instructions for issuing the HTTP requests and transmitting the information associated with the geographical location of the content delivery network are instructions to be performed by the web browser.

16. The method of claim 10, wherein the identity information for the edge server includes an identifier for an airport closest to the edge server.

17. The method of claim 10, wherein the request for the content delivery network to provide header information is a request only for header information from the content delivery network.

18. A non-transitory computer-readable medium having instructions stored thereon that are executable by a computing device to perform operations, comprising:
receiving a request for information associated with a website from a client device;
transmitting, to the diem device, the requested information from the website, wherein executable software instructions are appended to the requested information by the computer system, and wherein the executable software instructions includes instructions for the client device to:
issue, by the client device one or more HTTP requests to a content delivery network, wherein the HTTP requests include a request for the content delivery network to provide header information to the diem device that includes identity information for an edge server of the content delivery network closest to the diem device the identity information including a geographical location of the edge server of the content delivery network closest to the client device;
receive, at the; client device, the requested header information from the edge server of the content delivery network closest to the client device, wherein the received header information includes the identity information for the edge server; and
transmit, by the client device the identity information for the edge server to the edge server;
identifying the geographical location for the edge server that transmitted the header information to the client device by assessing the identity information received from the client device; and
determining the geographical location of the diem device based on the geographical location identified for the edge server that transmitted the header information to the client device.

19. The non-transitory computer-readable medium of claim 18, wherein the identity information for the edge seer includes an identity of the edge server.

20. The non-transitory computer-readable medium of claim 18, wherein the identity information for the edge server includes information that allows the geographical location of the edge server to be determined.

* * * * *

UNITED STATES PATENT AND TRADEMARK OFFICE
CERTIFICATE OF CORRECTION

| | | |
|---|---|---|
| PATENT NO. | : 11,800,163 B2 | Page 1 of 1 |
| APPLICATION NO. | : 17/549786 | |
| DATED | : October 24, 2023 | |
| INVENTOR(S) | : Mingkui Wei | |

It is certified that error appears in the above-identified patent and that said Letters Patent is hereby corrected as shown below:

In the Claims

Claim 1, Column 15, Line 13, after "from" and before "client", please add --a--.
Claim 2, Column 15, Line 46, please delete "He" and replace with --The--.
Claim 10, Column 16, Line 31, please delete "included" and replace with --includes--.
Claim 11, Column 16, Line 57, please delete "ofthe" and replace with --of the--.
Claim 14, Column 17, Line 3, after "location of", please add --the--.
Claim 18, Column 17, Line 24, please delete "diem" and replace with --client--.
Claim 18, Column 18, Line 2, please delete "diem" and replace with --client--.
Claim 18, Column 18, Line 6, please delete "diem" and replace with --client--.
Claim 18, Column 18, Line 14, after "edge server to the", and before "edge server;", add --computing device in response to receiving the header information from the--.
Claim 18, Column 18, Line 19, please delete "diem" and replace with --client--.
Claim 19, Column 18, Line 24, please delete "seer" and replace with --server--.

Signed and Sealed this
Second Day of January, 2024

Katherine Kelly Vidal
*Director of the United States Patent and Trademark Office*